US012639371B2

(12) United States Patent
Li et al.

(10) Patent No.: US 12,639,371 B2
(45) Date of Patent: May 26, 2026

(54) METHOD AND APPARATUS FOR SEMANTICIZATION, ELECTRONIC DEVICE AND READABLE STORAGE MEDIUM

(71) Applicant: Beijing Baidu Netcom Science Technology Co., Ltd., Beijing (CN)

(72) Inventors: Yanyan Li, Beijing (CN); Jingbo Zhou, Beijing (CN); Jizhou Huang, Beijing (CN); Dejing Dou, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 1077 days.

(21) Appl. No.: 17/721,659

(22) Filed: Apr. 15, 2022

(65) Prior Publication Data

US 2022/0237474 A1      Jul. 28, 2022

(30) Foreign Application Priority Data

Sep. 16, 2021    (CN) .......................... 202111088247.X

(51) Int. Cl.
    *G06F 16/90*        (2019.01)
    *G06F 16/901*       (2019.01)
(52) U.S. Cl.
    CPC ................................. *G06F 16/901* (2019.01)
(58) Field of Classification Search
    CPC . G06F 16/901; G06F 16/9537; G06F 16/9027
    See application file for complete search history.

(56) References Cited

U.S. PATENT DOCUMENTS

2015/0261786 A1*    9/2015   Xu ....................... G06F 16/9027
                                                                707/747

FOREIGN PATENT DOCUMENTS

| CN | 101350013 A | 1/2009 |
|----|-------------|--------|
| CN | 101996242 A | 3/2011 |
| CN | 103413313 A | 11/2013 |
| CN | 104778231 A | 7/2015 |
| CN | 109471909 A | 3/2019 |
| CN | 110032181 A | 7/2019 |
| CN | 110059264 A | 7/2019 |
| CN | 110175216 A | 8/2019 |
| CN | 111008255 A | 4/2020 |

(Continued)

OTHER PUBLICATIONS

Avinashilingam Nanjappan, R *—Tree index in Cassandra for Geospatial Processing, 2019 [retrieved online Sep. 19, 2025]. Master's Projects. 713. Retrieved from the Internet: https://web.archive.org/web/20200823230014/https://scholarworks.sjsu.edu/etd_projects/713/ (Year: 2019).*

(Continued)

*Primary Examiner* — Kristopher Andersen
(74) *Attorney, Agent, or Firm* — Knobbe, Martens, Olson & Bear, LLP

(57)            ABSTRACT

A method and apparatus for semanticization is provided. The method includes: ascertaining a target coordinate of a to-be-semanticized location; ascertaining, through a pre-built regional spatial index tree, a target region to which the target coordinate of the to-be-semanticized location belongs; and ascertaining semantic information of the to-be-semanticized location based on semantic information of the target region.

17 Claims, 2 Drawing Sheets

Ascertaining a target coordinate of a to-be-semanticized location — S101

Ascertaining, through a pre-built regional spatial index tree, a target region to which the target coordinate of the to-be-semanticized location belongs — S102

Ascertaining semantic information of the to-be-semanticized location based on semantic information of the target region — S103

(56) References Cited

FOREIGN PATENT DOCUMENTS

CN      111627058 A   *   9/2020  ............... G06T 7/70

OTHER PUBLICATIONS

Complete analysis and Java implementation of spatial data index RTree (R tree), https://www.onblogs.com/cmi-sh-love/p/kong-jian-shud-ju-suo-yinRTree-wan-quan-jie-xi-IIJa.html?share_token=e5b096d7-6dbf-4839-9992-b29913335ba9, printed on Dec. 9, 2024 in 22 pages.
First Office Action issued in Chinese Patent Application No. 202111088247.X dated Jun. 7, 2023 in 12 pages.

* cited by examiner

METHOD AND APPARATUS FOR SEMANTICIZATION, ELECTRONIC DEVICE AND READABLE STORAGE MEDIUM

This patent application claims the priority of Chinese Patent Application No. 202111088247.X, filed on Sep. 16, 2021, and entitled "Method and Apparatus for Semanticization, Electronic Device and Readable Storage Medium", the entire content of which is herein incorporated by reference.

TECHNICAL FIELD

The present disclosure relates to the field of geographic information system technology, and specifically to the field of coordinate and region semanticization technology.

BACKGROUND

In a spatiotemporal big data scenario, coordinate semanticization is an important means to enhance coordinate semantics and enrich coordinate information. By giving semanticization information to a coordinate, the spatial feature of a specific place can be better understood. Thus, the coordinate semanticization is widely applied to spatiotemporal applications such as a POI recommendation application, a taxi-hailing application, a food-delivery application.

SUMMARY

The present disclosure provides a method and apparatus for semanticization, an electronic device and a readable storage medium.

According to a first aspect of the present disclosure, a method for semanticization is provided. The method includes: ascertaining a target coordinate of a to-be-semanticized location; ascertaining, through a pre-built regional spatial index tree, a target region to which the target coordinate of the to-be-semanticized location belongs; and ascertaining semantic information of the to-be-semanticized location based on semantic information of the target region.

According to a second aspect of the present disclosure, an apparatus for semanticization is provided. The apparatus includes: a first ascertaining module, configured to ascertain a target coordinate of a to-be-semanticized location; a second ascertaining module, configured to ascertain, through a pre-built regional spatial index tree, a target region to which the target coordinate of the to-be-semanticized location belongs; and a third ascertaining module, configured to ascertain semantic information of the to-be-semanticized location based on semantic information of the target region.

According to a third aspect of the present disclosure, an electronic device is provided. The electronic device includes: at least one processor; and a memory communicatively connected to the at least one processor. The memory stores an instruction executable by the at least one processor, and the instruction when executed by the at least one processor, causes the at least one processor to perform the above method.

According to a fourth aspect of the present disclosure, a non-transitory computer readable storage medium storing a computer instruction is provided. The computer instruction is used to cause a computer to perform the above method.

It should be understood that the content described in this portion is not intended to identify key or important features of the embodiments of the present disclosure, and is not used to limit the scope of the present disclosure. Other features of the present disclosure will be easily understood through the following description.

BRIEF DESCRIPTION OF THE DRAWINGS

The accompanying drawings are used for a better understanding of the scheme, and do not constitute a limitation to the present disclosure.

DETAILED DESCRIPTION OF EMBODIMENTS

Exemplary embodiments of the present disclosure are described below in combination with the accompanying drawings, and various details of the embodiments of the present disclosure are included in the description to facilitate understanding, and should be considered as exemplary only. Accordingly, it should be recognized by one of ordinary skill in the art that various changes and modifications may be made to the embodiments described herein without departing from the scope and spirit of the present disclosure. Also, for clarity and conciseness, descriptions for well-known functions and structures are omitted in the following description.

Embodiment 1

Figure 1:
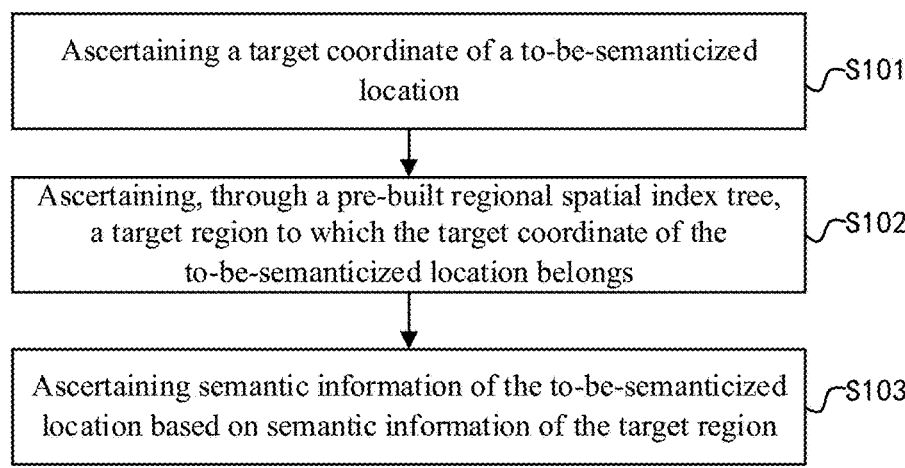
FIG. 1 is a schematic flowchart of a method for semanticization provided according to an embodiment of the present disclosure.

FIG. 1 illustrates a method for semanticization provided by an embodiment of the present disclosure. As shown in FIG. 1, the method includes the following steps.

Step S101, ascertaining a target coordinate of a to-be-semanticized location.

Specifically, the to-be-semanticized location may be a specific location point or a region. The target coordinate may be used as a representative of the location point or region. Here, semanticizing may also be understood as naming, for example, the semantic information of a region A is xx street in xx district.

Step S102, ascertaining, through a pre-built regional spatial index tree, a target region to which the target coordinate of the to-be-semanticized location belongs.

Specifically, the regional spatial index tree may be an R tree spatial index, or an other regional spatial index tree capable of realizing the functions of the present disclosure, for example, a B tree, an R+ tree, an R* tree, a QR tree and an X tree. Here, the R tree is a good solution to the problem of searching in a high-dimensional space and the like.

Figure 2:
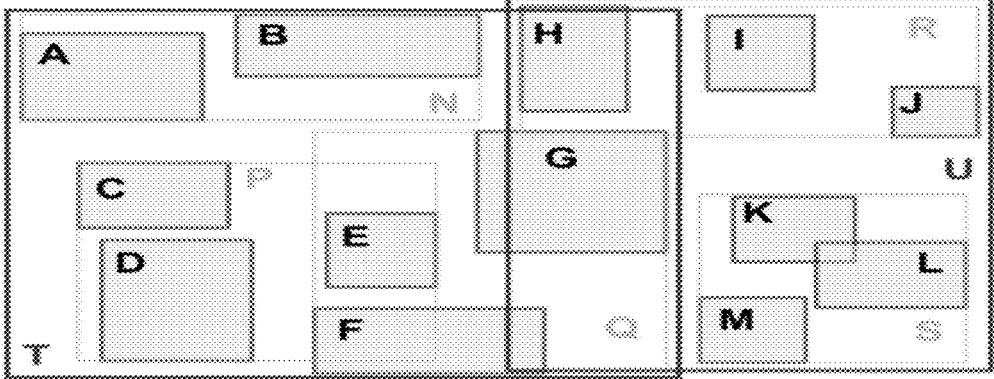
FIG. 2 is an example structure diagram of a spatial index tree provided according to an embodiment of the present disclosure.
Figure 3:
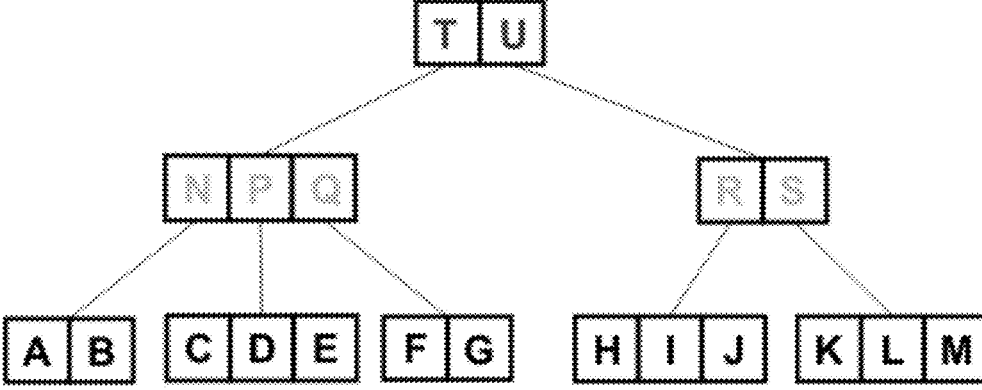
FIG. 3 is an example structure diagram of a spatial index tree provided according to an embodiment of the present disclosure.

Illustratively, the R tree is taken as an example to find all restaurants within 20 miles. If there is no R tree, in general, the coordinates (x, y) of a restaurant are divided into two fields to be stored in a database. One field records a longitude, and the other field records a latitude. In this way, it is required to traverse all the restaurants to acquire their location information, and then calculate whether the requirement is met. If there are 100 restaurants in a region, 100 location calculation operations are required. The R tree solves this high-dimensional space search problem very well, and extends the idea of the B tree to a multi-dimensional space. The R tree adopts the idea of space division of the B tree, and adopts a method of merging and decomposing nodes during addition and deletion operations to ensure the balance of the tree. Therefore, the R tree is a balanced tree used to store high-dimensional data. Illustratively, FIGS. 2 and 3 show an example of the R tree. The R tree applies the concept of space division. The R tree adopts a method called MBR (minimal bounding rectangle), which is to start from a leaf node to box the space using a rectangle. The higher the boundary is from the node, the larger the boxed space is, and accordingly, the division is performed on the space. According to the data structure of the R tree, when a high-dimensional space query needs to be performed, it is only required to traverse the pointers contained in a few leaf nodes to check whether the data pointed to by these pointers meets the requirement. This approach makes it not necessary to traverse all data to obtain the answer, thus significantly improving the efficiency.

Step S103, ascertaining semantic information of the to-be-semanticized location based on semantic information of the target region.

Specifically, the semantic information of the target region is used as the semantic information of the to-be-semanticized location.

The solution provided by the embodiment of the present disclosure is compared with the existing art in which it is required to manually ascertain the semanticization information corresponding to the coordinate. According to the present disclosure, the target coordinate of the to-be-semanticized location is ascertained; the target region to which target coordinate of the to-be-semanticized location belongs is ascertained through the pre-built regional spatial index tree; and the semantic information of the to-be-semanticized location is ascertained based on the semantic information of the target region. That is, the semantic information of the target region to which the target coordinate belongs is used as the semantic information of the target coordinate, which realizes the automatic ascertainment for the semantic information of the target coordinate. In addition, the target region is ascertained based on the pre-built regional spatial index tree, resulting in a low time complexity and a high computational efficiency.

The embodiment of the present disclosure provides a possible implementation, in which an information recommendation is performed based on the ascertained semantic information of the to-be-semanticized location.

Specifically, the semantic information of the to-be-semanticized location is the semantic information of the target region. If the semantic information of the target region is xx street, xx street may be used as the semantic information of the to-be-semanticized location. Based on the semantic information of the target region, some basic data of the target region may be ascertained. Then, a regional portrait of the target region is built based on the basic data, and a recommendation is performed, for example, a recommendation for a video and news. In addition, the regional portrait information of the target region may be directly ascertained according to the semantic information of the target region, and then, the recommendation is performed.

The embodiment of the present disclosure solves the problem of how to recommend information for the to-be-semanticized location.

The embodiment of the present disclosure provides a possible implementation, in which the to-be-semanticized location refers to one region. Ascertaining the target coordinate of the to-be-semanticized location includes: ascertaining a visual center point of the to-be-semanticized location; and using a coordinate of the visual center point of the to-be-semanticized location as the target coordinate of the to-be-semanticized location.

Specifically, if the to-be-semanticized location refers to a region, the visual center point of the to-be-semanticized location may be first ascertained, and the coordinate of the visual center point of the to-be-semanticized location is then used as the target coordinate of the to-be-semanticized location. Here, if the to-be-semanticized location refers to a location point, the coordinate of the location point may be directly used as the target coordinate. Here, the visual center point represents a center point visually located in the largest included rule region in a polygonal region. Here, the included rule region may be an included circle, an included rectangle, an included triangle, and the like. Here, the visual center point is used to represent the target region, which can solve the problem that the physical center point is not inside the polygon region and thus cannot represent the polygon.

Figure 4:
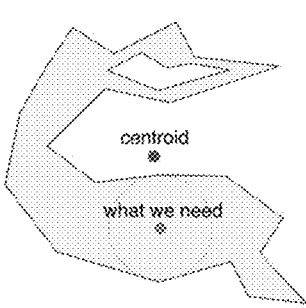
FIG. 4 is an example diagram of a visual center point of a region provided according to an embodiment of the present disclosure.

Here, illustratively, the point corresponding to "centroid" in FIG. 4 is not a visual center point, but a physical center point, and the point corresponding to "what we need" is the visual center point. The present disclosure utilizes the visual center point of the region rather than the physical center point of the region, to avoid the problem that the physical center point does not belong to the to-be-semanticized location and thus cannot represent the target region.

The embodiment of the present disclosure solves the problem of ascertaining the target coordinate of the to-be-semanticized location.

The embodiment of the present disclosure provides a possible implementation. In the implementation, the ascertaining a visual center point of the to-be-semanticized location includes: acquiring a closed polygon representing the to-be-semanticized location; selecting a largest available included rectangle or included circle from the closed polygon; ascertaining a geometric center point of the largest available included rectangle or included circle; and ascertaining the geometric center point as the visual center point of the to-be-semanticized location.

Specifically, the closed polygon representing the to-be-semanticized region (i.e., the to-be-semanticized location) is ascertained. Specifically, it is possible to represent the to-be-semanticized region by a plurality of vertices of the polygon; and ascertain, through a corresponding algorithm, the largest available included rectangle or included circle selected from the closed polygon, and ascertain the geometric center point of the largest available included rectangle or included circle (e.g., the intersection of the diagonal lines of the rectangle or the center of the circle) as the visual center point of the to-be-semanticized region.

The example of the present disclosure solves the problem of ascertaining the visual center of the target region.

The embodiment of the present disclosure provides a possible implementation. In the implementation, building of the pre-built regional spatial index tree includes: ascertaining region coordinate information representing respective candidate regions in an at least two-level region; ascertaining MBRs of the respective candidate region based on the ascertained region coordinate information of the respective candidate regions; and building the regional spatial index tree based on the MBRs of the respective candidate regions.

Illustratively, the region coordinate information representing respective candidate regions in a 6-level region (e.g., province, city, county, country, village, street) may be ascertained. Here, semantic information of the corresponding candidate regions in the 6-level region is already ascertained. The region polygon is given as: P=POLYGON(($x_0$ $y_0$), ($x_1$ $y_1$), ($x_2$ $y_2$) ($x_n$ $y_n$)).

First, the MBR of an region is acquired as follows, get_mbr_of_region(P):

$$x_{min}=\min(x_0,x_1,x_2\ldots x_n)$$

$$x_{max}=\max(x_0,x_1,x_2\ldots x_n)$$

$$y_{min}=\min(y_0,y_1,y_2\ldots y_n)$$

$$y_{max}=\max(y_0,y_1,y_2\ldots y_n)$$

Accordingly, MBR is $P_{mbr}=((x_{min}\ y_{min}), (x_{max}\ y_{min}))$.

Then, the MBR of a region of each level is placed into the R tree to build a spatial index tree, thus obtaining the built regional spatial index tree.

The embodiment of the present disclosure solves the problem of building the spatial index tree.

The embodiment of the present disclosure provides a possible implementation. In the implementation, the building the regional spatial index tree based on the minimum bounding rectangles of the respective candidate regions includes: ascertaining at least one current highest-level candidate region from current candidate regions; determining whether the current highest-level candidate region is a predetermined highest-level candidate region; and using, in response to the current highest-level candidate region being the predetermined highest-level candidate region, a minimum bounding rectangle corresponding to the current highest-level candidate region as a parent node.

Further, the method further includes: ascertaining at least one current highest-level candidate region from the current candidate regions, and adding a minimum bounding rectangle corresponding to each current highest-level candidate region as a child node of a minimum bounding rectangle corresponding to an upper-level candidate region to which the corresponding each current highest-level candidate region belongs; and repeating the above step until additions of all candidate regions are completed.

Illustratively, the candidate regions include three levels (e.g., a province level, a city level and a county level). Here, the candidate regions of the province level are respectively A and B (here, the province-level candidate regions A and B are the predetermined highest-level candidate regions). The province-level candidate region A includes city-level candidate regions a and b, and the province-level candidate region B includes city-level candidate regions c and d. The city-level candidate region a includes county-level candidate regions 1 and 2, and the city-level candidate region b includes county-level candidate regions 3 and 4.

The process of building the spatial index tree may be as follows. First, the current highest-level candidate regions ascertained from all the candidate regions are the candidate regions A and B. Since the candidate regions A and B are the predetermined highest-level candidate regions, the minimum bounding rectangles corresponding to the candidate regions A and B are respectively used as a parent node.

Second, the current highest-level candidate regions ascertained from the remaining candidate regions are the candidate regions a, b, c and d. Moreover, the upper-level candidate region to which the candidate regions a and b belong is the candidate region A, and the upper-level candidate region to which the candidate regions c and d belong is the candidate region B. The minimum bounding rectangles corresponding to the candidate regions a and b are used as the child nodes of the minimum bounding rectangle corresponding to the candidate region A, and the minimum bounding rectangles corresponding to the candidate regions c and d are used as the child nodes of the minimum bounding rectangle corresponding to the candidate region B.

The second step is repeated. The current highest-level candidate regions ascertained from the remaining candidate regions are the candidate regions 1, 2, 3 and 4. Moreover, the upper-level candidate region to which the candidate regions 1 and 2 belong is the candidate region a, and the upper-level candidate region to which the candidate regions 3 and 4 belong is the candidate region b. The minimum bounding rectangles corresponding to the candidate regions 1 and 2 are used as the child nodes of the minimum bounding rectangle corresponding to the candidate region a, and the minimum bounding rectangles corresponding to the candidate regions 3 and 4 are used as the child nodes of the minimum bounding rectangle corresponding to the candidate region b. The second step is continuously repeated. The building of the spatial index tree is completed when there is no candidate region.

The embodiment of the present disclosure solves the problem of building the spatial index tree.

The embodiment of the present disclosure provides a possible implementation. In the implementation, the ascertaining, through a pre-built regional spatial index tree, a target region to which the target coordinate of the to-be-semanticized location belongs includes: determining whether the target coordinate of the to-be-semanticized location belongs to a candidate region corresponding to a node of the pre-built regional spatial index tree; determining, in response to that the target coordinate belongs to the candidate region, whether the node corresponding to the candidate region includes a child node; and using, in response to that the node does not include the child node, the candidate region as the target region.

Illustratively, when matching is performed on the target location and the spatial index tree, whether the target coordinate is within the range of the node of the built spatial index tree is determined. If the node is within the range of a first-level node A, whether the node is within the range of a child node of A is further determined. If the node is within the range of the child node b of A, whether the node is within the range of a child node of b is further determined. If the node is within the range of the child node c of b, and c has no child node, the determination ends.

Here, the candidate region corresponding to the node c is the ascertained target region matching the target location, and the semantic information of the candidate region corresponding to c is used as the semantic information of a given point.

In addition, the semantic information of the candidate regions corresponding to A and b may also be used as the semantic information of a given target coordinate.

The embodiment of the present disclosure solves the problem of ascertaining the target region to which the target location belongs.

Embodiment 2

Figure 5:
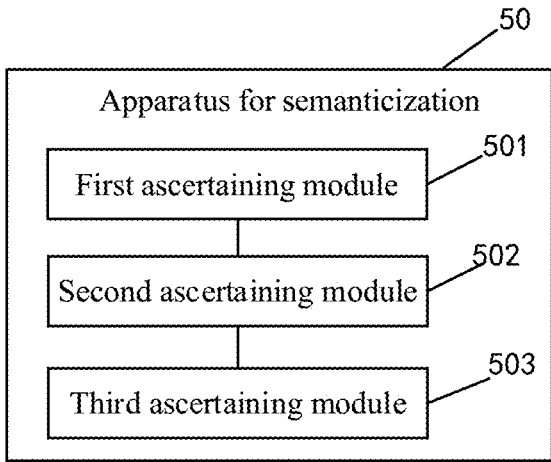
FIG. 5 is a schematic structural diagram of an apparatus for semanticization provided according to an embodiment of the present disclosure.

An embodiment of the present disclosure provides an apparatus for semanticization. As shown in FIG. 5, the apparatus includes: a first ascertaining module 501, configured to ascertain a target coordinate of a to-be-semanticized location; a second ascertaining module 502, configured to ascertain, through a pre-built regional spatial index tree, a target region to which the target coordinate of the to-be-semanticized location belongs; and a third ascertaining module 503, configured to ascertain semantic information of the to-be-semanticized location based on semantic information of the target region.

The embodiment of the present disclosure provides a possible implementation.

In the implementation, the apparatus further includes: a recommending module, configured to perform an information recommendation based on the ascertained semantic information of the to-be-semanticized location.

The embodiment of the present disclosure provides a possible implementation. In the implementation, the to-be-semanticized location refers to a region, and the apparatus further includes: a fourth ascertaining module, configured to ascertain a visual center point of the to-be-semanticized location; and a using module, configured to use a coordinate of the visual center point of the to-be-semanticized location as the target coordinate of the to-be-semanticized location.

The embodiment of the present disclosure provides a possible implementation. In the implementation, the fourth ascertaining module includes: an acquiring unit, configured to acquire a closed polygon representing the to-be-semanticized location; a selecting unit, configured to select a largest available included rectangle or included circle from the closed polygon; a first ascertaining unit, configured to ascertain a geometric center point of the largest available included rectangle or included circle; and a second ascertaining unit, configured to ascertain the geometric center point as the visual center point of the to-be-semanticized location.

The embodiment of the present disclosure provides a possible implementation. In the implementation, the apparatus further includes: a fifth ascertaining module, configured to ascertain region coordinate information representing respective candidate regions in an at least two-level region; a sixth ascertaining module, configured to ascertain minimum bounding rectangles of the respective candidate regions based on the ascertained region coordinate information of the respective candidate regions; and a building module, configured to build the regional spatial index tree based on the minimum bounding rectangles of the respective candidate regions.

The embodiment of the present disclosure provides a possible implementation. In the implementation, the building module is configured to ascertain at least one current highest-level candidate region from current candidate regions, and add a minimum bounding rectangle corresponding to each current highest-level candidate region as a child node of a minimum bounding rectangle corresponding to an upper-level candidate region to which the corresponding each current highest-level candidate region belongs; and repeat the above operation until additions of all candidate regions are completed.

The embodiment of the present disclosure provides a possible implementation. In the implementation, the building module is further configured to ascertain the at least one current highest-level candidate region from the current candidate regions; determine whether the current highest-level candidate region is a predetermined highest-level candidate region; and use, in response to the current highest-level candidate region being the predetermined highest-level candidate region, a minimum bounding rectangle corresponding to the current highest-level candidate region as a parent node.

The embodiment of the present disclosure provides a possible implementation. In the implementation, the second ascertaining module includes: a first determining unit, configured to determine whether the target coordinate of the to-be-semanticized location belongs to a candidate region corresponding to a node of the pre-built regional spatial index tree; a second determining unit, configured to further determine, in response to that the target coordinate belongs to the candidate region, whether the node corresponding to the candidate region includes a child node; and a using unit, configured to use, in response to that the node does not include the child node, the candidate region as the target region.

The beneficial effects achieved by the embodiment of the present disclosure are the same as those of the above embodiment of the method, and thus will not be repeatedly described here.

In the technical solution of the present disclosure, the acquisition, storage, application, etc. of the personal information of a user are all comply with the provisions of the relevant laws and regulations, and do not violate public order and good custom.

According to an embodiment of the present disclosure, the present disclosure further provides an electronic device, a readable storage medium and a computer program product.

The electronic device includes at least one processor; and a memory communicatively connected to the at least one processor. Here, the memory stores an instruction executable by the at least one processor, and the instruction when executed by the at least one processor, causes the at least one processor to perform the method provided in the embodiment of the present disclosure.

The electronic device is compared with the existing art in which it is required to manually ascertain the semanticization information corresponding to the coordinate. According to the present disclosure, the target coordinate of the to-be-semanticized location is ascertained; the target region to which the target coordinate of the to-be-semanticized location belongs is ascertained through the pre-built regional spatial index tree; and the semantic information of the to-be-semanticized location is ascertained based on semantic information of the target region. That is, the semantic information of the target region to which the target coordinate belongs is used as the semantic information of the target coordinate, which realizes the automatic ascertainment for the semantic information of the target coordinate. In addition, the target region is ascertained based on the pre-built regional spatial index tree, resulting in a low time complexity and a high computational efficiency.

The readable storage medium is a non-transitory computer readable storage medium storing a computer instruction. Here, the computer instruction is used to cause a computer to perform the method provided in the embodiments of the present disclosure.

The readable storage medium is compared with the existing art in which it is required to manually ascertain the semanticization information corresponding to the coordinate. According to the present disclosure, the target coordinate of the to-be-semanticized location is ascertained; the target region to which the target coordinate of the to-be-semanticized location belongs is ascertained through the pre-built regional spatial index tree; and the semantic information of the to-be-semanticized location is ascertained based on the semantic information of the target region. That is, the semantic information of the target region to which the target coordinate belongs is used as the semantic information of the target coordinate, which realizes the automatic ascertainment for the semantic information of the target coordinate. In addition, the target region is ascertained based on the pre-built regional spatial index tree, resulting in a low time complexity and a high computational efficiency.

The computer program product includes a computer program. The computer program, when executed by a processor, implements the method according to the first aspect of the present disclosure.

The computer program product is compared with the existing art in which it is required to manually ascertain the semanticization information corresponding to the coordinate. According to the present disclosure, the target coordinate of the to-be-semanticized location is ascertained; the target region to which the target coordinate of the to-be-semanticized location belongs is ascertained through the pre-built regional spatial index tree; and the semantic information of the to-be-semanticized location is ascertained based on the semantic information of the target region. That is, the semantic information of the target region to which the target coordinate belongs is used as the semantic information of the target coordinate, which realizes the automatic ascertainment for the semantic information of the target coordinate. In addition, the target region is ascertained based on the pre-built regional spatial index tree, resulting in a low time complexity and a high computational efficiency.

Figure 6:
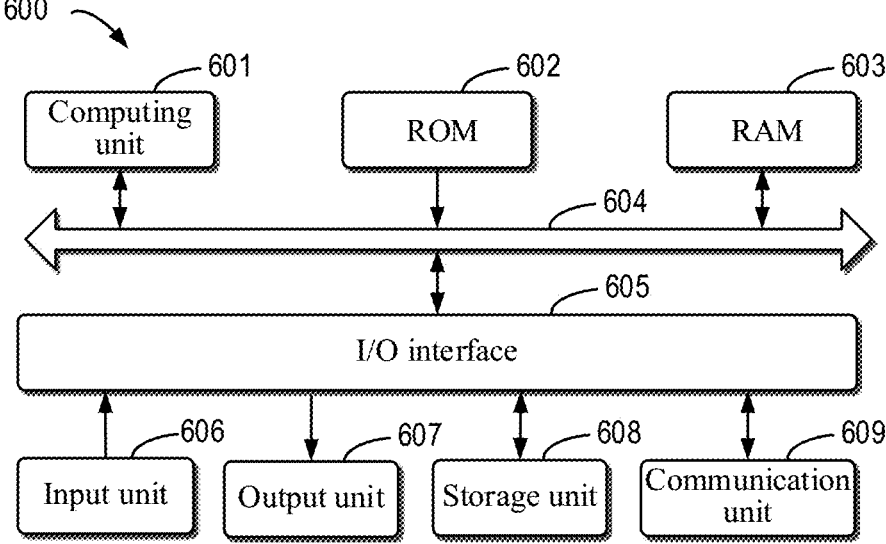
FIG. 6 is a block diagram of an electronic device used to implement embodiments of the present disclosure.

FIG. 6 is a schematic block diagram of an example electronic device 600 that may be used to implement embodiments of the present disclosure. The electronic device is intended to represent various forms of digital computers such as a laptop computer, a desktop computer, a workstation, a personal digital assistant, a server, a blade server, a mainframe computer, and other appropriate computers. The electronic device may alternatively represent various forms of mobile apparatuses such as personal digital processing, a cellular telephone, a smart phone, a wearable device and other similar computing apparatuses. The parts shown herein, their connections and relationships, and their functions are only as examples, and not intended to limit implementations of the present disclosure as described and/or claimed herein.

As shown in FIG. 6, the electronic device 600 includes a computation unit 601, which may execute various appropriate actions and processes in accordance with a computer program stored in a read-only memory (ROM) 602 or a computer program loaded into a random access memory (RAM) 603 from a storage unit 608. The RAM 603 also stores various programs and data required by operations of the device 600. The computation unit 601, the ROM 602 and the RAM 603 are connected to each other through a bus 604. An input/output (I/O) interface 605 is also connected to the bus 604.

The following components in the electronic device 600 are connected to the I/O interface 606: an input unit 606, for example, a keyboard and a mouse; an output unit 607, for example, various types of displays and a speaker; a storage device 608, for example, a magnetic disk and an optical disk; and a communication unit 609, for example, a network card, a modem, a wireless communication transceiver. The communication unit 609 allows the device 600 to exchange information/data with an other device through a computer network such as the Internet and/or various telecommunication networks.

The computation unit 601 may be various general-purpose and/or special-purpose processing assemblies having processing and computing capabilities. Some examples of the computation unit 601 include, but not limited to, a central processing unit (CPU), a graphics processing unit (GPU), various dedicated artificial intelligence (AI) computing chips, various processors that run a machine learning model algorithm, a digital signal processor (DSP), any appropriate processor, controller and microcontroller, etc. The computation unit 601 performs the various methods and processes described above, for example, the method for semanticization. For example, in some embodiments, the method for semanticization may be implemented as a computer software program, which is tangibly included in a machine readable medium, for example, the storage device 608. In some embodiments, part or all of the computer program may be loaded into and/or installed on the device 600 via the ROM 602 and/or the communication unit 609. When the computer program is loaded into the RAM 603 and executed by the computation unit 601, one or more steps of the above method for semanticization may be performed. Alternatively, in other embodiments, the computation unit 601 may be configured to perform the method for semanticization through any other appropriate approach (e.g., by means of firmware).

The various implementations of the systems and technologies described herein may be implemented in a digital electronic circuit system, an integrated circuit system, a field programmable gate array (FPGA), an application specific integrated circuit (ASIC), an application specific standard product (ASSP), a system-on-chip (SOC), a complex programmable logic device (CPLD), computer hardware, firmware, software and/or combinations thereof. The various implementations may include: being implemented in one or more computer programs, where the one or more computer programs may be executed and/or interpreted on a programmable system including at least one programmable processor, and the programmable processor may be a particular-purpose or general-purpose programmable processor, which may receive data and instructions from a storage system, at least one input device and at least one output device, and send the data and instructions to the storage system, the at least one input device and the at least one output device.

Program codes used to implement the method of embodiments of the present disclosure may be written in any combination of one or more programming languages. These program codes may be provided to a processor or controller of a general-purpose computer, particular-purpose computer or other programmable data processing apparatus, so that the program codes, when executed by the processor or the controller, cause the functions or operations specified in the flowcharts and/or block diagrams to be implemented. These program codes may be executed entirely on a machine, partly on the machine, partly on the machine as a stand-alone software package and partly on a remote machine, or entirely on the remote machine or a server.

In the context of the present disclosure, the machine-readable medium may be a tangible medium that may include or store a program for use by or in connection with an instruction execution system, apparatus or device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any appropriate combination thereof. A more particular example of the machine-readable storage medium may include an electronic connection based on one or more lines, a portable computer disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any appropriate combination thereof.

To provide interaction with a user, the systems and technologies described herein may be implemented on a computer having: a display device (such as a CRT (cathode ray tube) or LCD (liquid crystal display) monitor) for displaying information to the user; and a keyboard and a pointing device (such as a mouse or a trackball) through which the user may provide input to the computer. Other types of devices may also be used to provide interaction with the user. For example, the feedback provided to the user may be any form of sensory feedback (such as visual feedback, auditory feedback or tactile feedback); and input from the user may be received in any form, including acoustic input, speech input or tactile input.

The systems and technologies described herein may be implemented in: a computing system including a background component (such as a data server), or a computing system including a middleware component (such as an application server), or a computing system including a front-end component (such as a user computer having a graphical user interface or a web browser through which the user may interact with the implementations of the systems and technologies described herein), or a computing system including any combination of such background component, middleware component or front-end component. The components of the systems may be interconnected by any form or medium of digital data communication (such as a communication network). Examples of the communication network include a local area network (LAN), a wide area network (WAN), and the Internet.

A computer system may include a client and a server. The client and the server are generally remote from each other, and generally interact with each other through the communication network. A relationship between the client and the server is generated by computer programs running on a corresponding computer and having a client-server relationship with each other. The server may be a cloud server, a distributed system server, or a server combined with a blockchain.

It should be appreciated that the steps of reordering, adding or deleting may be executed using the various forms shown above. For example, the steps described in embodiments of the present disclosure may be executed in parallel or sequentially or in a different order, so long as the expected results of the technical schemas provided in embodiments of the present disclosure may be realized, and no limitation is imposed herein.

The above particular implementations are not intended to limit the scope of the present disclosure. It should be appreciated by those skilled in the art that various modifications, combinations, sub-combinations, and substitutions may be made depending on design requirements and other factors. Any modification, equivalent and modification that fall within the spirit and principles of the present disclosure are intended to be included within the scope of the present disclosure.

What is claimed is:

1. A method for semanticization, comprising:
ascertaining a target coordinate of a to-be-semanticized location;
ascertaining, through a pre-built regional spatial index tree, a target region to which the target coordinate of the to-be-semanticized location belongs; and ascertaining semantic information of the to-be-semanticized location based on semantic information of the target region,
wherein the pre-built regional spatial index tree comprises a plurality of leaf nodes, each of the plurality of leaf nodes comprises a pointer to corresponding regional spatial data in the database, and ascertaining, through a pre-built regional spatial index tree, the target region to which the target coordinate of the to-be-semanticized location belongs comprises: performing querying based on the pointer to ascertain the target region to which the target coordinate of the to-be-semanticized location belongs,
wherein the to-be-semanticized location refers to a region, and ascertaining the target coordinate of the to-be-semanticized location comprises:
ascertaining a visual center point of the to-be-semanticized location; and
using a coordinate of the visual center point of the to-be-semanticized location as the target coordinate of the to-be-semanticized location to position the target coordinate within the region.

2. The method according to claim 1, further comprising:
performing an information recommendation based on the ascertained semantic information of the to-be-semanticized location.

3. The method according to claim 1, wherein ascertaining the visual center point of the to-be-semanticized location comprises:
acquiring a closed polygon representing the to-be-semanticized location;
selecting a largest available included rectangle or included circle from the closed polygon;
ascertaining a geometric center point of the largest available included rectangle or included circle; and
ascertaining the geometric center point as the visual center point of the to-be-semanticized location.

4. The method according to claim 1, wherein the regional spatial index tree is an R tree.

5. The method according to claim 1, wherein building of the pre-built regional spatial index tree comprises:
ascertaining region coordinate information representing respective candidate regions in an at least two-level region;
ascertaining minimum bounding rectangles of the respective candidate regions based on the ascertained region coordinate information of the respective candidate regions; and
building the regional spatial index tree based on the minimum bounding rectangles of the respective candidate regions.

6. The method according to claim 5, wherein building the regional spatial index tree based on the minimum bounding rectangles of the respective candidate regions comprises:
determining at least one current highest-level candidate region from current candidate regions, and adding a minimum bounding rectangle corresponding to each current highest-level candidate region as a child node of a minimum bounding rectangle corresponding to an upper-level candidate region to which the corresponding each current highest-level candidate region belongs; and
repeating the determining and the adding operations until additions of all candidate regions are completed.

7. The method according to claim 6, further comprising:
ascertaining the at least one current highest-level candidate region from the current candidate regions;

determining whether the current highest-level candidate region is a predetermined highest-level candidate region; and using, in response to the current highest-level candidate region being the predetermined highest-level candidate region, a minimum bounding rectangle corresponding to the current highest-level candidate region as a parent node.

8. The method according to claim 1, wherein ascertaining, through the pre-built regional spatial index tree, the target region to which the target coordinate of the to-be-semanticized location belongs comprises:

determining whether the target coordinate of the to-be-semanticized location belongs to a candidate region corresponding to a node of the pre-built regional spatial index tree;

determining, in response to that the target coordinate belongs to the candidate region, whether the node corresponding to the candidate region includes a child node; and using, in response to that the node does not include the child node, the candidate region as the target region.

9. An electronic device, comprising:

at least one processor; and a memory, communicatively connected to the at least one processor, wherein the memory stores an instruction executable by the at least one processor, and the instruction when executed by the at least one processor, causes the at least one processor to perform operations, the operations comprising:

ascertaining a target coordinate of a to-be-semanticized location;

ascertaining, through a pre-built regional spatial index tree, a target region to which the target coordinate of the to-be-semanticized location belongs; and ascertaining semantic information of the to-be-semanticized location based on semantic information of the target region, wherein the pre-built regional spatial index tree comprises a plurality of leaf nodes, each of the plurality of leaf nodes comprises a pointer to corresponding regional spatial data in the database, and ascertaining, through a pre-built regional spatial index tree, the target region to which the target coordinate of the to-be-semanticized location belongs comprises: performing querying based on the pointer to ascertain the target region to which the target coordinate of the to-be-semanticized location belongs, wherein the to-be-semanticized location refers to a region, and ascertaining the target coordinate of the to-be-semanticized location comprises:

ascertaining a visual center point of the to-be-semanticized location; and using a coordinate of the visual center point of the to-be-semanticized location as the target coordinate of the to-be-semanticized location to position the target coordinate within the region.

10. The electronic device according to claim 9, wherein the operations further comprise:

performing an information recommendation based on the ascertained semantic information of the to-be-semanticized location.

11. The electronic device according to claim 10, wherein ascertaining the visual center point of the to-be-semanticized location comprises:

acquiring a closed polygon representing the to-be-semanticized location;

selecting a largest available included rectangle or included circle from the closed polygon;

ascertaining a geometric center point of the largest available included rectangle or included circle; and ascertaining the geometric center point as the visual center point of the to-be-semanticized location.

12. The electronic device according to claim 9, wherein the regional spatial index tree is an R tree.

13. The electronic device according to claim 9, wherein building of the pre-built regional spatial index tree comprises:

ascertaining region coordinate information representing respective candidate regions in an at least two-level region;

ascertaining minimum bounding rectangles of the respective candidate regions based on the ascertained region coordinate information of the respective candidate regions; and building the regional spatial index tree based on the minimum bounding rectangles of the respective candidate regions.

14. The electronic device according to claim 13, wherein building the regional spatial index tree based on the minimum bounding rectangles of the respective candidate regions comprises:

ascertaining at least one current highest-level candidate region from current candidate regions, and adding a minimum bounding rectangle corresponding to each current highest-level candidate region as a child node of a minimum bounding rectangle corresponding to an upper-level candidate region to which the corresponding each current highest-level candidate region belongs; and repeating the determining and the adding operations until additions of all candidate regions are completed.

15. The electronic device according to claim 14, wherein the operations further comprise:

ascertaining the at least one current highest-level candidate region from the current candidate regions;

determining whether the current highest-level candidate region is a predetermined highest-level candidate region; and using, in response to the current highest-level candidate region being the predetermined highest-level candidate region, a minimum bounding rectangle corresponding to the current highest-level candidate region as a parent node.

16. The electronic device according to claim 9, wherein ascertaining, through the pre-built regional spatial index tree, the target region to which the target coordinate of the to-be-semanticized location belongs comprises:

determining whether the target coordinate of the to-be-semanticized location belongs to a candidate region corresponding to a node of the pre-built regional spatial index tree;

determining, in response to that the target coordinate belongs to the candidate region, whether the node corresponding to the candidate region includes a child node; and using, in response to that the node does not include the child node, the candidate region as the target region.

17. A non-transitory computer readable storage medium, storing a computer instruction, wherein the computer instruction when executed by a processor, causes the processor to perform operations, the operations comprising:

ascertaining a target coordinate of a to-be-semanticized location;

ascertaining, through a pre-built regional spatial index tree, a target region to which the target coordinate of the to-be-semanticized location belongs; and ascertaining semantic information of the to-be-semanticized location based on semantic information of the target region, wherein the pre-built regional spatial index tree comprises a plurality of leaf nodes, each of the plurality of leaf nodes comprises a pointer to corresponding regional spatial data in the database, and ascertaining, through a pre-built regional spatial index tree, the target region to which the target coordinate of the to-be-semanticized location belongs comprises: performing querying based on the pointer to ascertain the target region to which the target coordinate of the to-be-semanticized location belongs, wherein the to-be-semanticized location refers to a region, and ascertaining the target coordinate of the to-be-semanticized location comprises:

ascertaining a visual center point of the to-be-semanticized location; and using a coordinate of the visual center point of the to-be-semanticized location as the target coordinate of the to-be-semanticized location to position the target coordinate within the region.

* * * * *